(12) United States Patent
Shirasu et al.

(10) Patent No.: US 8,818,828 B2
(45) Date of Patent: Aug. 26, 2014

(54) PRODUCTION PLAN APPARATUS

(75) Inventors: Yoshinori Shirasu, Yokohama (JP); Katsumi Narimatsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2136 days.

(21) Appl. No.: 11/555,903

(22) Filed: Nov. 2, 2006

(65) Prior Publication Data
US 2007/0129978 A1 Jun. 7, 2007

(30) Foreign Application Priority Data
Nov. 9, 2005 (JP) ................................ 2005-325314

(51) Int. Cl.
*G06Q 10/06* (2012.01)
(52) U.S. Cl.
USPC ........................................ 705/7.11; 705/7.28
(58) Field of Classification Search
CPC ................................ G06Q 10/063; G06F 9/44
USPC ............................................ 705/7, 7.11, 7.28
See application file for complete search history.

(56) References Cited

U.S. PATENT DOCUMENTS

| 6,714,947 B2 * | 3/2004 | Fa ........................................... 1/1 |
| 2003/0208389 A1 * | 11/2003 | Kurihara et al. .................. 705/7 |
| 2004/0210467 A1 * | 10/2004 | Yokoyama ......................... 705/8 |
| 2005/0144055 A1 * | 6/2005 | Horlacher et al. ................. 705/8 |
| 2006/0212323 A1 * | 9/2006 | Ninomiya .......................... 705/7 |
| 2007/0129978 A1 * | 6/2007 | Shirasu et al. .................... 705/7 |

FOREIGN PATENT DOCUMENTS

| JP | 2002-373011 | 12/2002 |
| JP | 2004-21384 | 1/2004 |

OTHER PUBLICATIONS

Analytical Evaluation of Hierarchical Planning Systems By Dempster et al. Operations Research vol. 29, No. 4, Jul.-Aug. 1981.*

* cited by examiner

*Primary Examiner* — Beth V Boswell
*Assistant Examiner* — Ernest A Jackson
(74) *Attorney, Agent, or Firm* — Oblon, Spivak, McClelland, Maier & Neustadt, L.L.P.

(57) ABSTRACT

A plurality of takeoff objectives are set based on a takeoff request with respect to a target step in production lines, at least throughput of each production line, and basic information of a production plan for each production line, production plan data satisfying the plurality of takeoff objectives is obtained, takeoff objective delay data indicating that the production plan data is delayed with respect to the plurality of takeoff objectives is obtained, and at least a degree of delay of the product is displayed based on the production plan data and the takeoff objective delay data in accordance with each of the plurality of takeoff objectives in a preset display conformation.

20 Claims, 5 Drawing Sheets

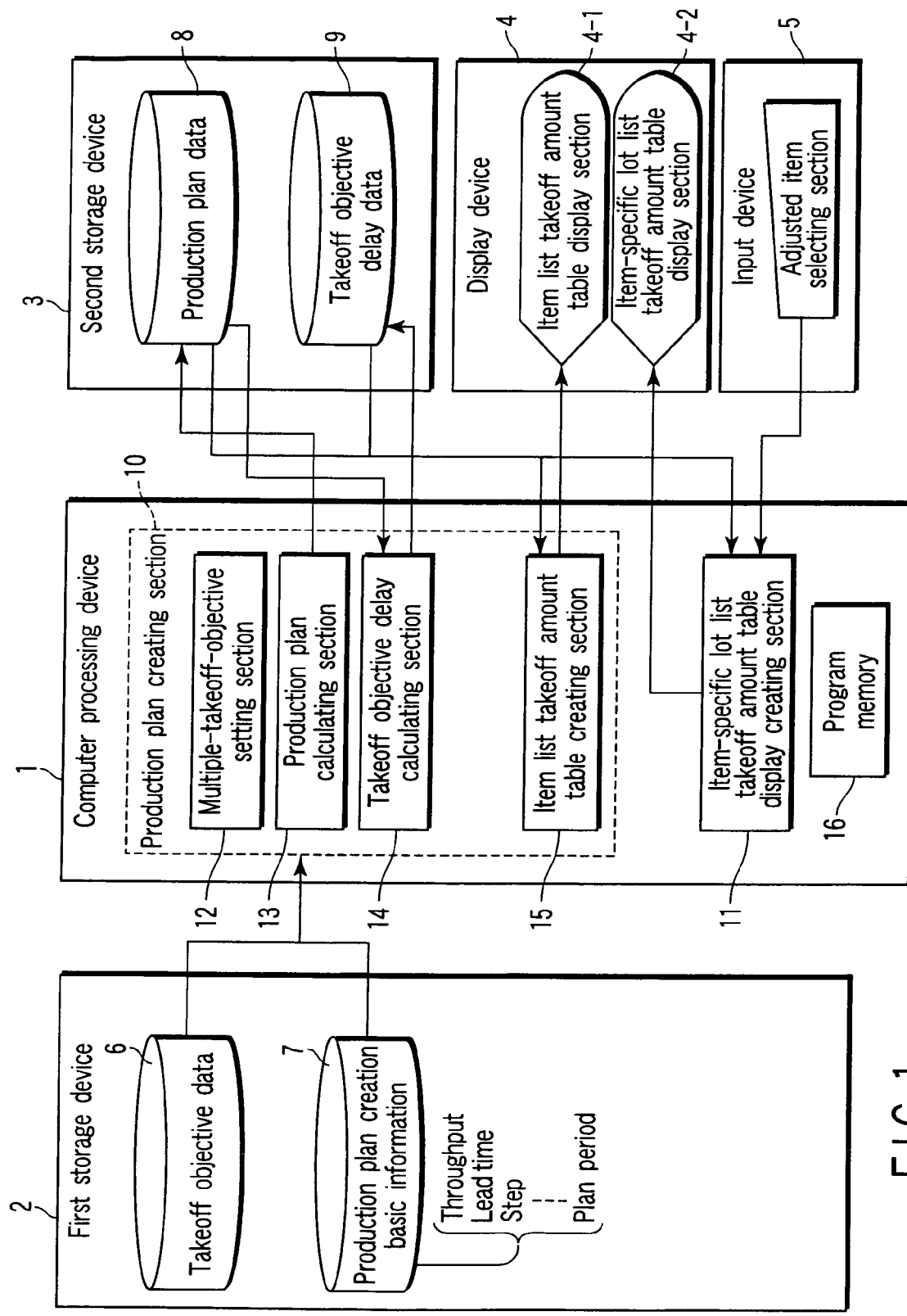
F I G. 1

| Item \ Step | 10/1 | 10/2 | 10/3 | 10/4 | | 10/31 |
|---|---|---|---|---|---|---|
| $N_1$ | 1 | 1 | 1 | 2 | | 1 |
| $N_2$ | 1 | 1 | 1 | 1 | | 1 |
| ⋮ | ⋮ | ⋮ | ⋮ | ⋮ | ⋮ | ⋮ |
| $N_i$ | 1 | 1 | 2 | 1 | | 2 |

FIG. 4

| Item \ Step | 10/1 | 10/2 | 10/3 | 10/4 | | 10/31 |
|---|---|---|---|---|---|---|
| $N_1$ | | | | 1 | | 3 |
| $N_2$ | | | | | | 1 |
| ⋮ | ⋮ | ⋮ | ⋮ | ⋮ | ⋮ | ⋮ |
| $N_i$ | | | 1 | | | 2 |

FIG. 5

| Item \ Step | 10/1 | 10/2 | 10/3 | 10/4 | 10/31 |
|---|---|---|---|---|---|
| $N_1$ | | | 2 | 1 | 3 |
| $N_2$ | | 1 | | 1 | 1 |
| $N_i$ | | | 1 | | 2 |

FIG. 6

| Item $N_1$ | Minimum multiple | M=56% |
|---|---|---|

| Lot status ratio K | $K_1$ | $K_2$ | $K_3$ | $K_4$ |
|---|---|---|---|---|
| | 5 | 10 | 10 | 10 |
| | 60~70 | 70~80 | 80~90 | 90~100 |

| Lot | Takeoff planned month | All requests | Third takeoff objective $W_3$ | Second takeoff objective $W_2$ | First takeoff objective $W_1$ |
|---|---|---|---|---|---|
| $N_{11}$ | 10/1 | 100% | 100% | | |
| $N_{12}$ | 10/2 | 95% | 100% | | |
| $N_{13}$ | 10/3 | 89% | 95% | 100% | |
| $N_{14}$ | 10/4 | 89% | 95% | 100% | |
| $N_{15}$ | 10/5 | 78% | 95% | 100% | |
| $N_{16}$ | 10/6 | 56% | 84% | 95% | 100% |

FIG. 7

PRODUCTION PLAN APPARATUS

BACKGROUND OF THE INVENTION

1. Field of the Invention

The present invention relates to a production plan apparatus that creates a production plan that is used to manufacture and deliver a requested quantity of products by a delivery date, e.g., an end of a month that is a predetermined deadline.

2. Description of the Related Art

A manufacturing process of a product is constituted of respective steps, e.g., processing, assembling, testing and others. These steps are made up of one or more production lines. These production lines are constituted of a plurality of processes. In these processes, an operation based on a production facility or manpower is carried out.

In a manufacturing plant, each product is manufactured based on a warehousing request set based on a request from a customer. The warehousing request is constituted of items of a requested product, a quantity, and a warehousing requested date. The manufacturing plant must take off each product from a final step to meet a warehousing requested date of each warehousing request.

In the manufacturing plant, a takeoff objective (delivery objective) at each step to take off a product from the final step is set in accordance with a warehousing request. The takeoff objective is constituted of items, a quantity, and a takeoff date of a requested product. The takeoff objective is calculated by, e.g., tracking back a lead time from a warehousing requested date to the next and subsequent steps based on computer arithmetic processing.

A warehousing objective or a takeoff objective in which a quantity of a product for each takeoff schedule is a product determined for the reason that a customer has been already informed of a delivery date is called a delivery request. According to the delivery request, a product must be taken off to avoid a delay on a priority base.

A production plan of a product corresponding to a predetermined item is created in accordance with each step in order to meet a takeoff objective. The production plan for each of these steps is calculated based on a lead time or throughput of the next and subsequent steps, e.g., throughput of each production line at each step, a lead time at each step for each item, or a takeoff objective from a customer by computer arithmetic processing. Further, the production plane at each step is represented in the form of a list of, e.g., each production quantity for each item of a product in each day at each step. This list is displayed in a display or the like.

The production plane obtained by the computer arithmetic processing may include delay of a takeoff quantity from a takeoff objective because of, e.g., throughput of a production line at each step or a restriction in a lead time and a takeoff objective period.

An operator of the production plan sees a list of the production plan displayed in the display to confirm a degree of delay of the production plan from the takeoff objective. After confirming the degree of delay in the production plan, the operator of the production plan considers a set throughput of the production line, a margin of the lead time, and others to adjust the production plane to recover from the delay with respect to the takeoff objective as much as possible. At this time, the operator of the production plan must also consider a degree of delay with respect to the takeoff objective based on, e.g., throughput at the next step. The degree of delay is a degree of an influence on takeoff from the final step based on a warehousing request.

A technology concerning the production plan is disclosed in, e.g., Jpn. Pat. Appln. KOKAI Publication No. 2002-373011. Jpn. Pat. Appln. KOKAI Publication No. 2002-373011 discloses a technology of judging whether production performance satisfies a production objective and outputting a countermeasure if the production objective is not satisfied.

BRIEF SUMMARY OF THE INVENTION

According to a main aspect of the present invention, there is provided a production plan apparatus comprising: a production plan creating section that creates production plan data required to achieve takeoff objectives of a production plan of manufacturing a product in production lines and delivering the product, and calculates takeoff objective delay data indicative of a degree of delay with respect to the takeoff objective of the production plan data; a display section; and a takeoff amount creating section that displays at least a degree of delay of the product based on the production plan data and the takeoff objective delay data in the display section in a preset display conformation in accordance with each of the plurality of takeoff objectives.

According to another main aspect of the present invention, there is provided a production plan apparatus comprising: a multiple-takeoff-objective setting section that sets a plurality of takeoff objectives having different priorities based on a takeoff request to manufacture and takeoff a preset quantity of a product corresponding to a present item by a predetermined deadline at a target step in each production line, throughput of each production line constituting at least the target step, and basic information of a production plan for each production line; a production plan calculating section that obtains production plan data satisfying the plurality of takeoff objectives set by the multiple-takeoff-objective setting section; a takeoff objective delay calculating section that obtains takeoff objective delay data indicating that the production plan data created by the production plan creating section is delayed from the plurality of takeoff objectives set by the multiple-takeoff objective setting section; a display section; and a takeoff amount creating section that displays at least a degree of delay of the production in the display section in a preset display conformation in accordance with each of the plurality of takeoff objectives based on the production plan data obtained by the production plan calculating section and the takeoff objective delay data obtained by the takeoff objective delay calculating section.

According to still another main aspect of the present invention, there is provided a production planning method comprising: setting a plurality of takeoff objectives having different priorities based on a takeoff request of manufacturing and taking off a preset quantity of a product corresponding to a preset item by a predetermined deadline at a target step in production lines, throughput of each production line constituting at lest the target step, and basic information of a production plane for each production line; obtaining production plan data that satisfies the plurality of set takeoff objectives; obtaining takeoff objective delay data indicating that the production plan data is delayed with respect to the plurality of takeoff objectives; and displaying at least a degree of delay of the product in accordance with each of the plurality of takeoff objectives in a preset display conformation based on the production plan data and the takeoff objective delay data.

According to yet another main aspect of the present invention, there is provided a storage medium that stores a production plan processing program, comprising: setting a plurality of takeoff objectives having difference priorities based on a takeoff request of manufacturing and taking off a preset quantity of a product corresponding to a preset item by a predetermined deadline at a target step in production lines, throughput of each production line constituting at least the target step, and basic information of a production plan for each production line; obtaining production plan data satisfying the plurality of set takeoff objectives; obtaining takeoff objective delay data indicating that the production plan data is delayed with respect to the plurality of takeoff objectives; and displaying a degree of delay of the product based on the production plan data and the takeoff objective delay data in accordance with each of the plurality of takeoff objectives in a preset display conformation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an embodiment of a production plan apparatus according to the present invention;

FIG. 4 shows production plan data calculated by a production plan calculating section in the apparatus;

FIG. 5 shows takeoff objective delay data calculated by a takeoff objective delay calculating section in the apparatus;

FIG. 6 shows an item list takeoff amount table obtained by an item list takeoff amount table creating section in the apparatus;

FIG. 7 shows an item-specific lot list takeoff amount table created by an item-specific lot list takeoff amount table creating section in the apparatus.

DETAILED DESCRIPTION OF THE INVENTION

Figure 2:
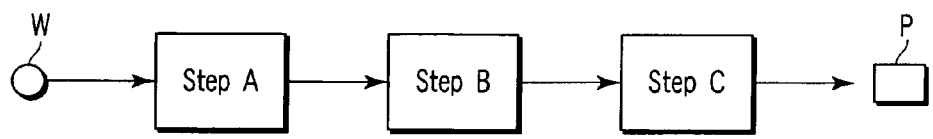
FIG. 2 is a schematic block diagram of a production line as a target of creation of a production plan by the apparatus.

An embodiment according to the present invention will now be described hereinafter with reference to the accompanying drawings.

FIG. 1 is a block diagram of a production plan apparatus. In this production plan apparatus, a first storage device 2, a second storage device 3, a display device 4, and an input device 5 are connected to a computer processing device 1. The display device 4 is, e.g., a liquid crystal display. The input device 5 is, e.g., a keyboard or a mouse.

A takeoff objective database 6 and a production plan creation basic information database 7 are formed in the first storage device 2. Takeoff objective data, for example a due out date, obtained by tracking back a lead time of the next step from a warehousing requested schedule of a warehousing request issued from a customer is stored in the takeoff objective database 6. The takeoff objective data is made up of each item of a production, a delivery date of a product in each month and a takeoff quantity on the delivery date. The takeoff objective data is represented as, e.g., an item: A, a month: N, a delivery date: 18th, or a quantity: 100. Further, each takeoff objective data has an identification flag for a delivery request, and set with respect to the delivery request alone.

Basic information required to create a production plan is stored in the production plan creation basic information database 7. The basic information is data of, e.g., each production line at a target step where a plan is formed, throughput of each production line, an item that can be manufactured in accordance with each production line, a lead time for each item, throughput of the next step of the target step where the plan is formed, or a plan period.

Data at a target step where a plan is formed is, e.g., one of pieces of data in an organization of respective continuous steps A, B, and C as shown in FIG. 2. When a workpiece W is put to step A, the workpiece W flows in the order of the respective steps A, B, and C, and is finally manufactured as a product P. If the target step where a plan is formed is step B, the next step is step C.

Data of throughput of a production line is constituted of the number of products that can be input or taken off each day in accordance with each production line at a step.

An item that can be manufactured in accordance with each production line is constituted of one or a plurality of items that can be manufactured in accordance with each production line.

Data of a lead time is data of a period required to process the workpiece W at step B when the target step where a plan is formed is step B. The data of a lead time is set in accordance with each item.

Data of a plan period or the like is data of a period in which a production plan is created, e.g., six months or three months. The data of a plan period or the like has a start day and an end day of a period A production plan database 8 and a takeoff objective delay database 9 are formed in the second storage device 3. The production plan database 8 stores production plan data obtained by the computer processing device 1. The takeoff objective delay database 9 stores takeoff objective delay data obtained by the computer processing device 1.

The display device 4 has, e.g., two display sections 4-1 and 4-2. One display section 4-1 is used to display an item list takeoff amount table. The display section 4-1 will be referred to as an item list takeoff amount table display section 4-1 hereinafter. The other display section 4-2 is used to display an item-sensitive lot list takeoff amount table. The display section 4-2 will be referred to as an item-sensitive lot list takeoff amount table display section 4-2.

The computer processing device 1 has a CPU, a ROM, a RAM, an I/O port and other elements. The CPU executes a production plan processing program stored in a program memory 16 such as a ROM. As a result, the computer processing device 1 has a production plan creating section 10 and an item-sensitive lot list takeoff amount table display creating section 11.

The production plan program is stored in the program memory 16 such as a RAM in advance. The production plan processing program is subjected to arithmetic processing by the CPU. The production plan processing program creates a production plane for manufacture of a product at a target step where a preset number of products corresponding to a preset item are manufactured and taken off by a predetermined deadline at the target step to meet a takeoff request.

That is, according to the production plan processing program, a plurality of takeoff objectives having different priorities are set based on throughput of each production line, items that can be manufactured in accordance with each production line, a lead time for each item, and a basic information of a production plan, e.g., a plan period constituting a takeoff request and at least each step, production plane data satisfying the plurality of set takeoff objectives is obtained, takeoff objective delay data indicating that the production plan data is delayed with respect to the plurality of takeoff objectives is obtained, and at least a degree of delay of products is displayed and output based on the production plan data and the takeoff objective delay data in accordance with each takeoff objective in a preset display conformation.

The production plan creating section 10 creates production plan data required to achieve takeoff objectives, and calculates a degree of delay of the product from the takeoff objective with respect to the production plan data. The production plan creating section 10 has a multiple-takeoff-objective setting section 12, a production plan calculating section 13, a takeoff objective delay calculating section 14, and an item list takeoff amount table creating section 15.

The multiple-takeoff-objective setting section 12 reads takeoff objective data stored in the takeoff objective database 6. At the same time, the multiple-takeoff-objective setting section 12 reads basic information of a production plan stored in the production plan creation basic information database 7. The basic information of a production plan is, e.g., throughput of each production line at the target step B where a plan is formed, items that can be manufactured in accordance with each production line, a lead time for each item, throughput at the next step C of step B, a lead time for each item at step B, a plan period, and others.

The multiple-takeoff-objective setting section 12 sets a takeoff objective for each of a plurality of schedules based on the read takeoff objective data and basic information of the production plan. The takeoff objective for each of the plurality of schedules is, e.g., a takeoff objective accelerated in accordance with each schedule while considering throughput at the next step, or a takeoff objective required to perform leveled production at ?a self-step? obtained by coupling original takeoff objectives through an envelope curve. The plurality of takeoff objectives include the original takeoff objectives.

Further, the multiple-takeoff-objective setting section 12 sets arbitrary different priorities to the respective takeoff objectives. The respective takeoff objectives created in the multiple-takeoff-objectives setting section 12 may be calculated in advance and stored in the takeoff objective database 6.

Figure 3:
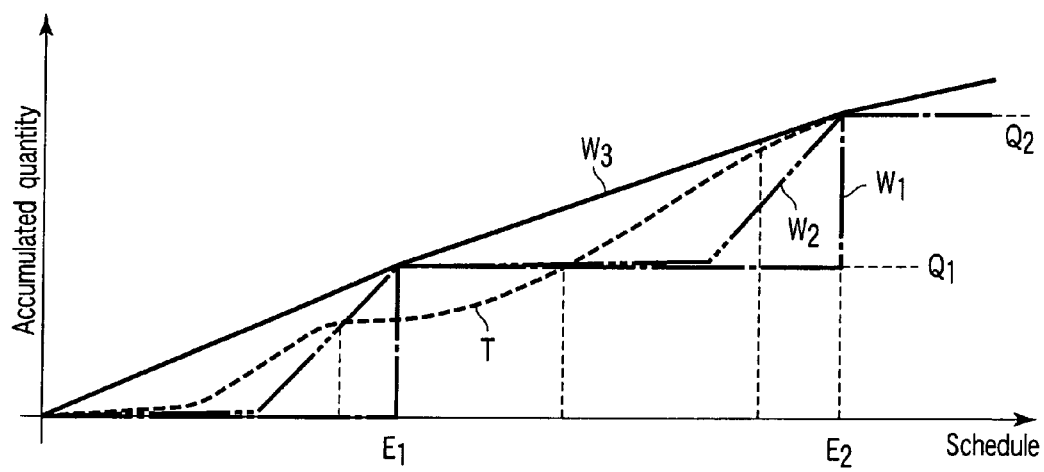
FIG. 3 shows a plurality of takeoff objectives having different priorities set by the apparatus.

FIG. 3 shows an example of respective takeoff objectives having different priorities and a production plan. In this drawing, an abscissa axis represents a schedule, and an ordinate axis represents an accumulated takeoff quantity of one specified item in a production plan. As the respective takeoff objectives having different priorities, there are a first takeoff objective (dashed line) $W_1$, a second takeoff objective (double dashed line) $W_2$, and a third takeoff objective (solid line) $W_3$. In regard to the respective priorities of the first takeoff objective $W_1$, the second takeoff objective $W_2$, and the third takeoff objective $W_3$, the highest priority is set to the first takeoff objective $W_1$, the second highest priority is set to the second takeoff objective $W_2$, and the lowest priority is set to the third takeoff objective $W_3$ ($W_1 \gg W_2 \gg W_3$), for example.

The first takeoff objective $W_1$ is a takeoff objective to meet a takeoff objective by a cutoff date (delivery date) at the end of a month, e.g., a predetermined deadline. As the first takeoff objective $W_1$, for example, respective takeoff quantities $Q_1$ and $Q_2$ of a product are set in accordance with each of cutoff dates $E_1$ and $E_2$. The first takeoff objective $W_1$ is a takeoff objective at a plan target step accelerated while considering a lead time of the next and subsequent steps to a last step from a warehousing requested date.

The second takeoff objective $W_2$ is, e.g., a takeoff objective obtained based on a throughput restriction for each date and each item with respect to the step when manufacturing a product at the next step C of the plan target step B. Specifically, the second takeoff objective $W_2$ is a takeoff objective at the plan target step obtained by accelerating the first takeoff objective $W_1$ at the next step while considering throughput for each item at step C following step B if the next step of step A is step B.

The third takeoff objective (solid line) $W_3$ is a takeoff objective obtained by leveling the first takeoff objective $W_1$ in accordance with each date. Specifically, the third takeoff objective (solid line) $W_3$ is a takeoff objective of the plan target step obtained by leveling the first takeoff objective $W_1$ through connection using an envelope curve in FIG. 3, for example.

As shown in FIG. 3, the production plan calculating section 13 obtains production plan data T (dotted line) satisfying the plurality of takeoff objectives, i.e., the first to the third takeoff objectives $W_1$ to $W_3$ set by the multiple-takeoff-objective setting section 12 as shown in FIG. 3.

Specifically, the production plan calculating section 13 digitizes each priority set to each item of a product and each priority for each takeoff objective in accordance with a value of each priority. The digitized value increases as a priority value greatens. Subsequently, the production plan calculating section 13 performs optimization processing of minimizing a sum total of a product of a delay quantity for each item of a product and a priority value of a delayed takeoff objective after digitization. As a result, the production plan calculating section 13 stores the calculated production plan data T in the production plan database 8. Production plan processing of the production plan calculating section 13 is carried out by utilizing optimization processing, e.g., linear programming.

Here, assuming that a priority of an item i in respective items of a product is Pi, the production plan data T can be calculated by minimizing the following expression:

$$\begin{cases} \sum^{item}(\text{delayed days} \times \text{quantity} \times Pi) \times W_1 + \\ \sum^{item}(\text{delayed days} \times \text{quantity} \times Pi) \times W_2 + \\ \sum^{item}(\text{delayed days} \times \text{quantity} \times Pi) \times W_3 \end{cases} \quad (1)$$

FIG. 4 shows an example of the production plan data T. The production plan data T is represented in the form of a table having sections of each item Ni of the product and a schedule. The production plan data T indicates the production number for each item Ni of the product for each day. In regard to the item $N_1$ of the product, a quantity of this item that is planed to be manufactured on October 1 is one, a quantity of the same that is planed to be manufactured on October 2 is one, and a quantity of the same that is planed to be manufactured on October 3 is two.

The takeoff objective delay calculating section 14 reads the production plan data T stored in the production plan database 8. At the same time, the takeoff objective delay calculating section 14 receives the plurality of takeoff objectives set by the multiple-takeoff-objective setting section 12, i.e., the first to the third takeoff objectives $W_1$ to $W_3$. The takeoff objective delay calculating section 14 compares the production plan data T with the first to the third takeoff objectives $W_1$ to $W_3$ to obtain each takeoff objective delay data S indicating that the production plan data T is delayed from each of the first to the third takeoff objectives $W_1$ to $W_3$. The takeoff objective delay calculating section 14 stores each obtained takeoff objective delay data S in the takeoff objective delay database 9.

FIG. 5 shows an example of the takeoff objective delay data S. The takeoff objective delay data S is represented in the form of a table having sections of each item Ni of a product and a schedule. The takeoff objective delay data S indicates delay data of the production plan data T with respect to the first takeoff objective $W_1$.

For example, the item Ni of a product indicates that the quantity of this item delayed from the first takeoff objective $W_1$ is one on October 4 and the quantity of this item delayed from the same is three on a cutoff date $E_1$. The takeoff objective delay calculating section 14 also calculates delay data of the production plan data T with respect to the second takeoff objective $W_2$ and delay data of the production plan data T with respect to the third takeoff objective $W_3$, respectively. An explanation of an example of calculating these delay data will be omitted in order to avoid complication.

The item list takeoff amount table creating section 15 reads the production plan data T stored in the production plan database 8. At the same time, the item list takeoff amount table creating section 15 reads the takeoff objective delay data S stored in the takeoff objective delay database 9. The item list takeoff amount table creating section 15 maps the production plan data T and the takeoff objective delay data S, and displays and outputs at least a degree of delay of the product in accordance with each of the plurality of takeoff objectives in a preset display conformation in the item list takeoff amount table display section 4-1. The display conformation is, e.g., respective display colors or respective fonts (character styles) different from each other.

Specifically, the item list takeoff amount table creating section 15 obtains an item list takeoff amount table H in which delay quantities of respective items of the product are listed in accordance with each day. The item list takeoff amount table creating section 15 determines one of the first, the second, and the third takeoff objectives $W_1$, $W_2$, and $W_3$ to which a product for each item delayed in the item list takeoff amount table H corresponds. The item list takeoff amount table creating section 15 displays the delayed quantities in each display color or each font (character style) preset with respect to the first, the second, or the third takeoff objective $W_1$, $W_2$, or $W_3$ in the item list takeoff amount table display section 4-1.

FIG. 6 shows an example of the item list takeoff amount table H. The item list takeoff amount table H is represented in the form of a table having sections of each item Ni of a product and each schedule. In case of delay with respect to the first takeoff objective $W_1$, a delayed quantity is displayed in, e.g., a red display color. In case of delay with respect to the second takeoff objective $W_2$, a delayed quantity is displayed in, e.g., an orange display color. In case of delay with respect to the third takeoff objective $W_3$, a delayed quantity is displayed in, e.g., a green display color.

In FIG. 6, each display color is represented based on a difference in fonts. The red display color with respect to the first takeoff objective $W_1$ is represented by means of bold type. The orange display color with respect to the second takeoff objective $W_2$ is represented by means of small type. The green display color with respect to the third takeoff objective $W_3$ is represented by means of a dotted line. In case of delay with respect to the plurality of takeoff objectives, a delayed quantity is displayed in the form of delay display with respect to a takeoff objective having the highest priority in the delayed takeoff objectives.

The item-specific lot table takeoff amount table display creating section 11 reads the production plan data T stored in the production plan database 8. At the same time, the item-specific lot table takeoff amount table display creating section 11 reads the takeoff objective delay data S stored in the takeoff objective delay database 9. The item-specific lot list takeoff amount table display creating section 11 creates an item-specific lot list takeoff amount table J showing a product takeoff plan of a desired one item for each day based on the production plan data T and the takeoff objective delay data S. Further, the item-specific lot list takeoff amount table display creating section 11 displays the item-specific lot list takeoff amount table J in the item-specific lot table takeoff amount table display section 4-2 of the display device 4.

The input device 5, e.g., a keyboard or a mouse is connected with the item-specific lot list takeoff amount table display creating section 11. The input device 5 accepts a human-based operation by, e.g., a production planner. The input device 5 receives, e.g., input of data of one desired item of a product. The input device 5 will be referred to as an adjusted item selecting section 5 hereinafter. Therefore, the adjusted item selecting section 5 accepts a human-based operation by, e.g., a production planner, and transmits data of one desired item of a product selected by the operation to the item-specific lot list takeoff amount table display creating section 11. The item-specific lot list takeoff amount table display creating section 11 creates the item-specific lot list takeoff amount table J of one item of a product selected by the operation with respect to the adjusted item selecting section 5.

FIG. 7 shows an example of the item-specific lot list takeoff amount table J. The item-specific lot list takeoff amount table J displays each of the first, the second, and the third takeoff objectives $W_1$, $W_2$, and $W_3$ and each lead time multiple satisfying the production plan data T of a product having a desired item with respect to all of these takeoff objectives $W_1$, $W_2$ and $W_3$. This lead time multiple is indicative of a percentage of reducing a lead time satisfying the production plan data T of a product having a desired item with respect to all of the takeoff objectives $W_1$, $W_2$, and $W_3$.

Specifically, the item-specific lot list takeoff amount table J shows respective lots $N_{11}$, $N_{12}$, $N_{13}$, . . . , Nim of, e.g., an item $N_1$ of items Ni of a product, a takeoff planned date (e.g., October 1 and 2), a lead time multiple with respect to all requests, and respective lead time multiple with respect to the first, the second, and the third takeoff objectives $W_1$, $W_2$, and $W_3$.

Each lead time multiple is displayed in each display color or each font (character style) preset with respect to the first, the second, or the third takeoff objective $W_1$, $W_2$, or $W_3$. For example, a lead time multiple with respect to the first takeoff objective $W_1$ is displayed in a red display color. A lead time multiple with respect to the second takeoff objective $W_2$ is displayed in an orange display color. A lead time multiple with respect to the third takeoff objective W3 is displayed in a green display color.

It is to be noted that each display color is represented based on a difference in fonts in FIG. 7. The red display color for the lead time multiple with respect to the first takeoff objective $W_1$ is represented by means of bold type. The orange display color for the lead time multiple with respect to the second takeoff objective $W_2$ is represented by means of small type. The green display color for the lead time multiple with respect to the third takeoff objective $W_3$ is represented by means of a dotted line.

For example, a lead time multiple "100%" with respect to the third takeoff objective $W_3$ means that the production plan data T is satisfied with respect to all of the first, the second, and the third takeoff objectives $W_1$, $W_2$, and $W_3$.

A lead time multiple "100%" with respect to the second takeoff objective $W_2$ means that the production plan data T is not satisfied with respect to the third takeoff objective $W_3$ but the production plan data T is satisfied with respect to the first and the second takeoff objectives $W_2$ and $W_3$. Likewise, a lead time multiple "100%" with respect to the first takeoff objective $W_1$ means that the production plan data T is not satisfied with respect to the second and the third takeoff objective $W_2$ and $W_3$ but the production plan data T is satisfied with respect to the third takeoff objective $W_3$.

The item-specific lot list takeoff amount table J shows a lower limit value (minimum multiple percentage) M that allows adjusting the lead time multiple (%) and a lot status ratio table K. The lower limit value (minimum multiple percentage) M that allows adjusting the lead time multiple (%) is indicative of a value that allows reducing a lead time of, e.g., step B shown in FIG. 2. The minimum multiple M is set to, e.g., 56%. That is, the minimum multiple M of the lead time multiple (%) is a value corresponding to a limit value for, e.g., effecting full production to process the workpiece W at step B, and means that further reduction is impossible.

A lead time with respect to all requests of, e.g., an item $N_{16}$ is set to, e.g., 56% in the item-specific lot list takeoff amount table J. In this case, the item-specific lot list takeoff amount table display creating section 11 gives a warning about the fact that the lead time exceeds the minimum multiple M. The item-specific lot list takeoff amount table display creating section 11 displays the warning in, e.g., the item-specific lot list takeoff amount table display section 4-2. The item-specific lot list takeoff amount table display creating section 11 gives the warning by means of, e.g., sound.

Ratios of each lot with respect to all lots corresponding to 60 to 70%, 70 to 80%, 80 to 90%, and 90 to 100% as, e.g., respective lead time multiples $K_1, K_2, K_3$, and $K_4$ are set in the lot status ratio table K. The lot status ratio table K shows that respective upper limit values of the lot ratios corresponding to the respective lead time multiples $K_1, K_2, K_3$, and $K_4$ are set to be not greater than 5%, 10%, 10%, and 10%.

Therefore, when ratios of a lot corresponding to each lot status with respect to the number of all lots exceed the respective upper limit values 5%, 10%, 10%, and 10% set in the lot status ratio table K, the item-specific lot list takeoff amount table display creating section 11 displays a warning indicative of this fact in, e.g., the item-specific lot list takeoff amount table display section 4-2. The item-specific lot list takeoff amount table display creating section 11 gives the warning by means of, e.g., sound.

Figure 8:
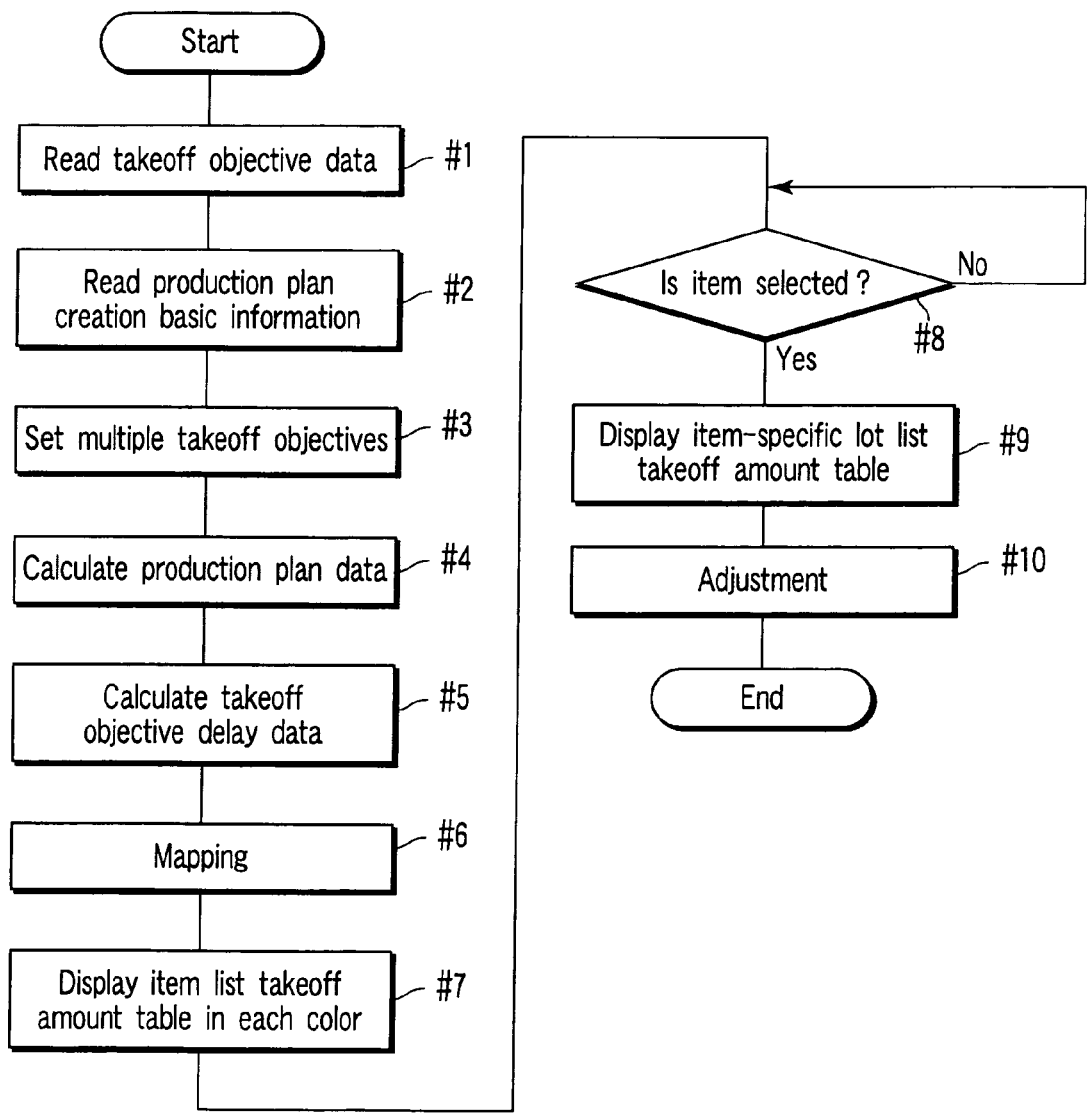
FIG. 8 shows a production plan flowchart in the apparatus.

An operation of the thus configured apparatus will now be described with reference to a production plan flowchart in FIG. 8.

The takeoff objective database 6 stores takeoff objective data obtained by tracking back a lead time of the next step from a warehousing requested schedule of a warehousing request issued by a customer. The takeoff objective data is made up each item of a product, a delivery date in each month, and a takeoff quantity on a delivery date. The takeoff objective data is represented as, e.g., an item: A, a month: N, a delivery date: 18th, and a takeoff quantity: 100. Furthermore, each takeoff objective data has an identification flag for a delivery request, and is set with respect to a delivery request alone.

The production plan creation basic information database 7 stores data, e.g., each production line at a target step where a plan is formed, throughput of each of these production lines, an item that can be manufactured in each production line, a lead time for each item, throughput at the next step of the target step where the plan is formed, a plan period, and others as basic information required to create the production plan.

The multiple-takeoff-objective setting section 12 in the computer processing device 1 reads takeoff objective data stored in the takeoff objective database 6 at step #1. The multiple-takeoff-objective setting section 12 reads basic information of the production plan stored in the production plan creation basic information database 7, e.g., throughput of each production line at the target step B where the plan is formed, an item that can be manufactured in each production line, a lead time for each item, throughput at the next step C following step B, a lead time for each item at step B, a plan period, and others at step #2.

It is to be noted that the multiple-takeoff-objective setting section 12 may read the basic information of the production plan stored in the production plan creation basic information database 7 and subsequently read takeoff objective data stored in the takeoff objective database 6.

Then, at step #3, the multiple-takeoff-objective setting section 12 sets a takeoff objective for each of a plurality of schedules based on the read takeoff objective data and basic information of the production plan. The takeoff objective for each of the plurality of schedules is, e.g., a takeoff objective accelerated in accordance with each schedule while considering throughput at the next step, or a takeoff objective required to perform leveled production at a ?self-step? obtained by coupling original takeoff objectives through an envelope curve. The plurality of takeoff objectives include the original objectives. Moreover, the multiple-takeoff-objective setting section 12 sets arbitrary different priorities to the respective takeoff objectives.

FIG. 3 shows an example of respective takeoff objectives having different priorities and the production plan to be created. As the respective takeoff objectives having different priorities, there are the first takeoff objective (dashed line) $W_1$, the second takeoff objective (double dashed line) $W_2$, and the third takeoff objective (solid line) $W_3$. In regard to the respective priorities of the first takeoff objective $W_1$, the second takeoff objective $W_2$, and the third takeoff objective $W_3$, the first takeoff objective $W_1$ has the highest priority, the second takeoff objective $W_2$ has the second highest priority, and the third takeoff objective $W_3$ has the lowest priority ($W_1 \gg W_2 \gg W_3$).

Then, at step #4, the production plan calculating section 13 obtains the production plan data T (doted line) satisfying the plurality of takeoff objectives, i.e., the first to the third takeoff objectives $W_1$ to $W_3$ set by the multiple-takeoff-objective setting section 12 as shown in FIG. 3.

Specifically, the production plan calculating section 13 digitizes each priority set for each item of a product and each priority for each takeoff objective in accordance with a value of each priority. A digitized value increase as a value of priority greatens. Subsequently, the production plan calculating section 13 performs optimization processing of minimizing a sum total of a product of a delay quantity for each item of a product and a priority value of a delayed takeoff objective after digitization. As a result, the production plan calculating section 13 stores the calculated production plan data T in the production plan database 8. Production plan processing of the production plan calculating section 13 is performed by utilizing optimization processing, e.g., linear programming. As a result, the production plan calculating section 13 calculates the production plan data T shown in, e.g., FIG. 4.

Then, at step #5, the takeoff objective delay calculating section 14 reads the production plan data T stored in the production plan data base 8. At the same time, the takeoff objective delay calculating section 14 receives the plurality of takeoff objectives set by the multiple-takeoff-objective setting section 12, i.e., the first to the third takeoff objectives $W_1$ to $W_3$. The takeoff objective delay calculating section 14 compares the production data T with the first to the third takeoff objectives $W_1$ to $W_3$.

Based on this comparison, the takeoff objective delay calculating section 14 calculates delay data of the production data T with respect to the first takeoff objective $W_1$, delay data of the production plan data T with respect to the second takeoff objective $W_2$, and delay data of the production plan data T with respect to the third takeoff objective $W_3$, respectively. The takeoff objective delay calculating section 14 stores each calculated delay data in the takeoff objective delay database 9.

FIG. 5 shows, e.g., the delay data of the production plan data T with respect to the first takeoff objective $W_1$. For example, one item $N_1$ of a product is delayed with respect to the first takeoff objective $W_1$ on, e.g., October 4. The three items $N_1$ are delayed on a cutoff date $E_1$.

Then, at step #6, the item list takeoff amount table creating section 15 reads the production plan data T stored in the production plan database 8. At the same time, the item list takeoff amount table creating section 15 reads the takeoff objective delay data S stored in the takeoff objective delay database 9. The item list takeoff amount table creating section 15 maps the production plan data T and the takeoff objective delay data S to obtain an item list takeoff amount table H as shown in FIG. 6. Subsequently, the item list takeoff amount table creating section 15 displays and outputs degrees of delay of a product in a display conformation preset for each of the plurality of takeoff objectives, respective different display colors, and respective fonts in the item list takeoff amount table display section 4-1.

Specifically, as shown in FIG. 6, the item list takeoff amount table creating section 15 obtains the item list takeoff amount table H in which a delayed quantity for each item i of a product is listed in accordance with each day as shown in FIG. 6. The item list takeoff amount table creating section 15 determines one of the first, the second, and the third takeoff objectives $W_1$, $W_2$, and $W_3$ to which a product including each delayed item corresponds in the item list takeoff amount table H. The item list takeoff amount table creating section 15 displays a delayed quantity in each display color or each font preset for the determined first, second, or third takeoff objective $W_1$, $W_2$, or $W_3$ in the item list takeoff amount table display section 4-1.

As shown in the item list takeoff amount table H in FIG. 6, when the production plan data T is delayed with respect to the first takeoff objective $W_1$, the item list takeoff amount table creating section 15 displays a delayed quantity in, e.g., a red display color. When the production plan data T is delayed with respect to the second takeoff objective $W_2$, the item list takeoff amount table creating section 15 displays a delayed quantity in, e.g., an orange display color. When the production plan data T is delayed with respect to the third takeoff objective $W_3$, the item list takeoff amount table creating section 15 displays a delayed quantity in, e.g., a green display color.

In this manner, the delayed quantity is displayed in each red, orange, or green display color. As a result, it is possible to visually plainly identify that the production plan data T is delayed with respect to the first takeoff objective $W_1$, the second takeoff objective $W_2$, or the third takeoff objective $W_3$. For example, the first takeoff objective $W_1$ is set as a minimal objective satisfying a warehousing request to a manufacturing plant set based on a request from a customer. When taking off of a product is delayed from the first takeoff objective $W_1$, the request of the customer cannot be satisfied.

Therefore, if there is the production plan data T delayed with respect to the first takeoff objective $W_1$ that has the highest priority and is displayed in red, the fact that the production plan data T must be adjusted can be visually, clearly, and plainly identified.

A delayed quantity is displayed in each red, orange, or green display color. As a result, a degree of delay of the production plan data T can be visually, clearly, and plainly identified. In other words, it is possible to judge whether a takeoff request from a customer can be satisfied based a level of adjustment of the production plan data T obtained from a degree of delay of the production plan data T.

Then, at step #8, the item-specific lot list takeoff amount table display creating section 11 judges whether one desired item of a product is selected by the adjusted item selecting section 5, e.g., a keyboard or a mouse. If a product corresponding to the one item is selected as a result of this judgment, the item-specific lot list takeoff amount table display creating section 11 reads the production plan data T stored in the production plan database 8 at step #9. At the same time, the item-specific lot list takeoff amount table display creating section 11 reads the takeoff objective delay data S stored in the takeoff objective delay database 9.

Subsequently, the item-specific lot list takeoff amount table display creating section 11 creates such an item-specific lot list takeoff amount table J as depicted in FIG. 7 showing a product takeoff plan for each day of one desired item based on the production plan data T and the takeoff objective delay data S. The item-specific lot list takeoff amount table display creating section 11 displays the item-specific lot list takeoff amount table J in the item-specific lot list takeoff amount table display section 4-2 of the display device 4.

The item-specific lot list takeoff amount table J shows respective lots $N_{11}$, $N_{12}$, $N_{13}$, ..., Nim of, e.g., an item $N_1$ of items Ni of a product, takeoff planned dates (e.g., October 1 and 2), a lead time multiple with respect to all requests, and each lead time multiple with respect to the first, the second, or the third takeoff objective $W_1$, $W_2$, or $W_3$.

Each lead time multiple is displayed in each display color preset with respect to the first, the second, or the third takeoff objective $W_1$, $W_2$, or $W_3$. For example, a lead time multiple with respect to the first takeoff objective $W_1$ is displayed in a red display color. A lead time multiple with respect to the second takeoff objective $W_2$ is displayed in an orange display color. A lead time multiple with respect to the third takeoff objective $W_3$ is displayed in a green display color.

In the item-specific lot list takeoff amount table J, for example, the lead time multiple "100%" with respect to the third takeoff objective $W_3$ means that the production plan data T can be satisfied with respect to all of the first, the second, and the third takeoff objectives $W_1$, $W_2$, and $W_3$. The lead time multiple "100%" with respect to the second takeoff objective $W_2$ means that the production plan data T is not satisfied with respect to the third takeoff objective $W_3$ but the production plan data T can be satisfied with respect to the first and the second takeoff objectives $W_2$ and $W_3$. Likewise, the lead time multiple "100%" with respect to the first takeoff objective $W_1$ means that the production plan data T is not satisfied with respect to the second and the third takeoff objectives $W_2$ and $W_3$ but the production plan data T is satisfied with respect to the third takeoff objective $W_3$.

The lead time multiple is indicative of a percentage of a reduction in a lead time to satisfy the production plan data T of a product corresponding to a desired item i with respect to each of the first, the second, and the third takeoff objective $W_1$, $W_2$, or $W_3$ and all of the first, the second, and the third takeoff objectives $W_1$, $W_2$, and $W_3$. As a result, for example, a lot of the item $N_1$ of a product whose lead time can be adjusted at, e.g., step B can be determined in order to create the production plan data T that satisfies the first takeoff objective $W_1$ having the highest priority.

In the item-specific lot list takeoff amount table J, a lower limit value (minimum multiple percentage) M that allows adjusting a lead time multiple (%) is set. The minimum multiple M is set to, e.g., 56%. For example, a lead time with respect to all requests of an item $N_{16}$ is set to 56%. As a result, the item-specific lot list takeoff amount table display creating section 11 displays in, e.g., the item-specific lot list takeoff amount table display section 4-2 a warning informing that the lead time is equal to or above the minimum multiple 56%. Alternatively, the item-specific lot list takeoff amount table display creating section 11 gives a warning by means of, e.g., sound.

As a result, reducing the lead time with respect to all requests of, e.g., the item $N_{16}$ to 56% means a value corresponding to a limit value with which full production or the like is carried out at, e.g., step B to process the workpiece W, and a further reduction can be determined.

In the lot status ratio table K, for example, ratios of each lot, i.e., 60 to 70%, 70 to 80%, 80 to 90%, and 90 to 100% are set as, e.g., respective lead time multiples $K_1$, $K_2$, $K_3$, and $K_4$. The lot status ratio table K shows that respective upper limit values of the lead time multiples $K_1$, $K_2$, $K_3$, and $K_4$ are set to be not greater than 5%, 10%, 10%, and 10%.

Therefore, when the lead time multiples $K_1$, $K_2$, $K_3$, and $K_4$ are set to be equal to or above the respective upper limit values 5%, 10%, 10%, and 10% set in the lot status ratio table K, the item-specific lot list takeoff amount table display creating section 11 displays in, e.g., the item-specific lot list takeoff amount table display section 4-2 a warning indicating that the lead time multiples $K_1$, $K_2$, $K_3$, and $K_4$ are not smaller than the respective upper limit values. Alternatively, the item-specific lot list takeoff amount table display creating section 11 gives a warning by means of, e.g., sound.

As described above, according to the embodiment, the first to the third takeoff objectives $W_1$ to $W_3$ having different priorities are set based on the takeoff request for manufacturing and taking off a preset quantity of a product by a predetermined deadline and the basic information of the production plan having throughputs of the respective steps A, B, and C. The production plan data T satisfying the first to the third takeoff objectives $W_1$ to $W_3$ is automatically obtained. Each takeoff objective delay data S indicating that the production plan data T is delayed with respect to each of the first, the second, and the third takeoff objectives $W_1$, $W_2$, and $W_3$ is obtained. The item list takeoff amount table H showing a degree of delay of each product is displayed and output based on the production plan data T and each takeoff objective delay data S in a display conformation preset for each of the first to the third takeoff objectives $W_1$ to $W_3$, e.g., a red, orange, or green display color or a font in the item list takeoff amount table display section 4-1.

As a result, the item list takeoff amount table H displayed in the item list takeoff amount table display section 4-1 is viewed. Consequently, it is possible to recognize one of the first, the second, and the third takeoff objectives $W_1$, $W_2$, and $W_3$ having different priorities from which the production plan data T is delayed based on a difference in, e.g., red, orange, or green display color or font. Therefore, it is visually, clearly, and plainly identify an instantaneous judgment on satisfaction of the takeoff request by the customer by adjusting a level of delay or the production plan data T.

The item list takeoff amount table H shows a list of a delayed quantity of each item i of a product for each day. As a result, a delayed quantity of each item i of the product for each day can be identified. For example, if there is the production plan data T that is delayed with respect to the first takeoff objective $W_1$ that has the highest priority and is displayed in "red", the fact that this production plan data T must be adjusted can be visually, clearly, and plainly identified.

The item-specific lot list takeoff amount table display creating section 11 creates such an item-specific lot list takeoff amount table J as shown in, e.g., FIG. 7 that shows a product takeoff plan of one desired item for each day based on the production plan data T and the takeoff objective delay data S, and displays the created table in the item-specific lot list takeoff amount table display section 4-2.

The item-specific lot list takeoff amount table J shows each lead time multiple indicative of a percentage of a reduction in a lead time for satisfying the production plan data T of a product corresponding to a desired item with respect to all requests and all of the first, the second, and the third takeoff objectives $W_1$, $W_2$, and $W_3$. In the item-specific lot list takeoff amount table J, the lead time multiple is displayed in each, e.g., red, orange, or green display color or each font with respect to the first, the second, or the three takeoff objective $W_1$, $W_2$, or $W_3$.

As a result, a lot of an item $N_1$ of a product whose lead time can be adjusted in, e.g., step B can be determined in order to create the production plan data T satisfying, e.g., the first takeoff objective $W_1$ having the highest priority in the first, the second, and the third takeoff objectives $W_1$, $W_2$, and $W_3$.

In the item-specific lot list takeoff amount table J, a lower limit value (minimum multiple percentage) M that allows adjustment of the lead time multiple (%) is set. As a result, a warning indicating that the lead time multiple (%) is not lower than the minimum multiple can be displayed in, e.g., the item-specific lot list takeoff amount table display section 4-2, or given through sound or the like. Therefore, the lead time is not reduced beyond the limit value of the lead time in which full production or the like is performed to process the workpiece W at, e.g., step B. That is, an adjustment range of the lead time can be displayed or warned.

In the item-specific lot list takeoff amount table J, ratios of respective lots, e.g., 60 to 70%, 70 to 80%, 80 to 90%, and 90 to 100% are set. The item-specific lot list takeoff amount table J shows the lot status ratio table K in which upper limit values of the respective lead time multiples $K_1$, $K_2$, $K_3$, and $K_4$ are set to be not greater than 50%, 10%, 10%, and 10%. As a result, a warning informing the fact that the respective lead time multiples $K_1$, $K_2$, $K_3$, and $K_4$ are not lower than the respective upper limit values can be displayed in, e.g., the item-specific lot list takeoff amount table display section 4-2 or given through sound or the like.

It is to be noted that the present invention is not restricted to the foregoing embodiment, and can be modified in the following manner.

In the foregoing embodiment, the first, the second, and the third takeoff objectives $W_1$, $W_2$, and $W_3$ for a delivery request in which a deadline, e.g., an end of a month as a delivery date and a product quantity are determined are set in accordance with, e.g., each item of a product as takeoff objectives set based on a warehousing request issued from a customer. However, there are some products whose delivery date and quantity are not determined. In regard to such a product, a delivery request and other requests are discriminated, and a first, a second, and a third takeoff objectives $W_1'$, $W_2'$, and $W_3'$ which are of a different type may be set with respect to takeoff objectives other than the delivery request, thereby creating production plan data T.

A degree of display in the item list takeoff amount table H is displayed in, e.g., a red, orange, or green display color or a font. The present invention is not restricted thereto, the display colors may be changed to other colors, or each different mark such as "○", "□", or "Δ" may be adjacently added to a delayed quantity as a display conformation. A degree of delay may be displayed and output in at least one different display conformation of an underline, highlighting, and blinking.

As shown in FIG. 3, the first takeoff objective $W_1$, the second takeoff objective $W_2$, and the third takeoff objective $W_3$ that are set by the multiple-takeoff objective setting section 12 and the production plan data T obtained by the production plan calculating section 13 may be graphically represented and displayed in the liquid crystal display of the display device 4. In this case, the first takeoff objective $W_1$ is displayed in, e.g., a red display color. The second takeoff objective $W_2$ is displayed in, e.g., an orange display color. The third takeoff objective $W_3$ is displayed in, e.g., a green display color.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A production plan apparatus comprising:
a processor;
a storage device connected to the processor; and
a display device connected to the processor,
wherein the storage device stores a takeoff request to manufacture a preset quantity of a product corresponding to a plurality of preset items at a target step in production lines by a delivery deadline, throughput of each production line constituting at least the target step, and basic information of a production plan for each production line, wherein the processor comprises:
a multiple-takeoff-objective setting section that sets a plurality of takeoff objectives each having different priorities based on the takeoff request stored in the storage device, the throughput of each of the production lines, and the basic information of the production plan for each of the production lines;
a production plan calculating section that obtains production plan data satisfying the plurality of takeoff objectives set by the multiple-takeoff-objective setting section;
a takeoff objective delay calculating section that obtains takeoff objective delay data indicating that the production plan data created by the production plan creating section is delayed with respect to the plurality of takeoff objectives set by the multiple-takeoff-objective setting section; and
a takeoff amount creating section that displays on the display device at least a degree of delay of the product based on the production plan data obtained by the production plan calculating section and the takeoff objective delay data obtained by the takeoff objective delay calculating section in accordance with each of the plurality of takeoff objectives in a preset display conformation,
wherein the multiple-takeoff-objective setting section sets a first takeoff objective included in the plurality of takeoff objectives required to satisfy the takeoff request by the delivery deadline, a second takeoff objective obtained based on a restriction in throughput for each date and each of the items with respect to a step when manufacturing the product at a next step of the target step, and a third takeoff objective obtained by leveling the second takeoff objective in accordance with each of the dates, a highest priority being set to the first takeoff objective, a second highest priority being set to the second takeoff objective, and a lowest priority being set to the third takeoff objective,
wherein the production plan calculating section digitizes each priority set to each of the items of the product and each of the priorities for each of the first to third takeoff objectives in accordance with a value of each priority, and carries out optimization processing of minimizing a sum total of a product of a delayed quantity for each of the items of the product and the priority value of the delayed first to third takeoff objectives after digitization to obtain the production plan data satisfying the first to third takeoff objectives set by the multiple-takeoff-objective setting section, and
wherein, when said each priority of an item i in respective of the items of the product is Pi, and the production plan data T is calculated by said optimization processing by minimizing:

item $\Sigma$(delayed days×quantity×$Pi$)×$W_1$

+item $\Sigma$(delayed days×quantity×$Pi$)×$W_2$

+item $\Sigma$(delayed days×quantity×$Pi$)×$W_3$, where $W_1$, $W_2$ and $W_3$ represent the first, second and third takeoff objectives.

2. The production plan apparatus according to claim 1, wherein the multiple-takeoff-objective setting section has at least items that can be manufactured in each of the production lines, a lead time for each of the items, and a plan period of the production plan as the basic information of the production plan.

3. The production plan apparatus according to claim 1, wherein the storage device comprises:
a takeoff objective database that stores takeoff objective data having each item of the product, a delivery date of the product for each month, and a takeoff quantity on the delivery date; and
a production plan creation basic information database that stores the basic information of the production plan having at least the items that can be manufactured in the production lines, a lead time for each item, and a plan period of the production plan,
wherein the multiple-takeoff-objective setting section sets the plurality of takeoff objectives in accordance with each schedule based on the takeoff objective data stored in the takeoff objective database and the basic information of the production plan stored in the production plan creation basic information database.

4. The production plan apparatus according to claim 1, wherein the multiple-takeoff-objective setting section has at least throughput of each production line constituting each target step, the items that can be manufactured in each production line, a lead time for each item, and the production plan such as a plan period as the basic information of the production plan, and sets the plurality of takeoff objectives based on the basic information and throughput of the next step that restricts a production throughput of the target step where the plan is formed.

5. The production plan apparatus according to claim 1, wherein the takeoff amount creating section displays and outputs the degree of delay corresponding to a type of the delayed takeoff objective based on at least one of a display color, a font, an underline, highlighting, and blinking as the display conformation.

6. The production plan apparatus according to claim 1, wherein the takeoff amount creating section obtains an item list takeoff amount table in which items of the product delayed with respect to the takeoff objectives are listed, and displays a degree of delay in the items of the product in the display conformation in the item list takeoff amount table.

7. The production plan apparatus according to claim 1, wherein the takeoff amount creating section obtains an item list takeoff amount table in which the delayed quantity of the product for each item is listed in accordance with each day, determines one of the plurality of takeoff objectives to which the delayed product for each item corresponds in the item list takeoff amount table, and displays the delayed quantity in the display conformation preset with respect to the determined takeoff objective.

8. The production plan apparatus according to claim 2, wherein the production plan calculating section digitizes each priority set in accordance with each item of the product in such a manner that the value increases as the priority greatens, and carries out the optimization processing of minimizing the sum total obtained by multiplying the delayed quantity of the product for each item by the priority for each item.

9. The production plan apparatus according to claim 1, further comprising:
a production plan database that stores the production plan data obtained by the production plan calculating section.

10. The production plan apparatus according to claim 1, further comprising:
a takeoff objective delay database that stores the takeoff objective delay data obtained by the takeoff objective delay calculating section.

11. The production plan apparatus according to claim 1, wherein the multiple-takeoff-objective setting section additionally sets a plurality of takeoff objectives of the product whose delivery deadline and quantity are not determined with respect to the plurality of takeoff objectives, and
the production plan calculating section obtains production plan data that satisfies the plurality of takeoff objectives additionally set by the multiple-takeoff-objectives setting section.

12. A production planning method comprising:
storing, in a storage device, a takeoff request to manufacture a preset quantity of a product corresponding to a plurality of preset items at a target step in production lines by a delivery deadline, throughput of each production line constituting at least the target step, and basic information of a production plan for each production line,
setting, at a processor, a plurality of takeoff objectives having different priorities based on the takeoff request stored in the storage device, the throughput of each of the production lines, and the basic information of the production plan for each manufacturing line;
obtaining, at the processor, production plan data satisfying the plurality of set takeoff objectives;
obtaining, at the processor, takeoff objective delay data indicating that the production plan data is delayed with respect to the plurality of takeoff objectives; and
displaying, on a display device, at least a degree of delay of the product based on the production plan data and the takeoff objective delay data in accordance with each of the plurality of takeoff objectives in a preset display conformation,
wherein the plurality of objectives include a first takeoff objective included in the plurality of takeoff objectives required to satisfy the takeoff request by the delivery deadline, a second takeoff objective obtained based on a restriction in throughput for each date and each of the items with respect to a step when manufacturing the product at a next step of the target step, and a third takeoff objective obtained by leveling the second takeoff objective in accordance with each of the dates, a highest priority being set to the first takeoff objective, a second highest priority being set to the second takeoff objective, and a lowest priority being set to the third takeoff objective,
wherein the production plan data is obtained by digitizing each priority set to each of the items of the product and each of the priorities for each of the first to third takeoff objectives in accordance with a value of each priority, and carrying out optimization processing of minimizing a sum total of a product of a delayed quantity for each of the items of the product and the priority value of the delayed first to third takeoff objectives after digitization, the production plan data satisfying the first to third takeoff objectives set by the multiple-takeoff-objective setting section, and
wherein, when said each priority of an item i in respective of the items of the product is Pi, and the production plan data T is calculated by said optimization processing by minimizing:

item $\Sigma$(delayed days×quantity×$Pi$)×$W_1$

+item $\Sigma$(delayed days×quantity×$Pi$)×$W_2$

+item $\Sigma$(delayed days×quantity×$Pi$)×$W_3$, where $W_1$, $W_2$ and $W_3$ represent the first, second and third takeoff objectives.

13. The production planning method according to claim 12, wherein the basic information of the production plan has at least items that can be manufactured in accordance with each production line, a lead time for each item, and a plan period of the production plan.

14. The production planning method according to claim 12, wherein the plurality of takeoff objectives are set in accordance with each schedule.

15. The production planning method according to claim 12, wherein a degree of delay corresponding to a type of the delayed takeoff objective is displayed and output in the different display conformation that is at least one of a display color, a font, an underline, highlighting, and blinking.

16. The production planning method according to claim 12, wherein a takeoff amount is created by obtaining an item list takeoff amount table in which items of the product delayed with respect to the takeoff objectives are listed, and displaying the degree of delay in the items of the product in the display conformation in the item list takeoff amount table.

17. The production planning method according to claim 12, wherein a takeoff amount is created by obtaining an item list takeoff amount table in which a delayed quantity of the product for each item is listed in accordance with each day, determining one of the plurality of takeoff objectives to which the delayed product for each item corresponds in the item list takeoff amount table, and displaying the delayed quantity in the display conformation preset with respect to the determined takeoff objective.

18. The production planning method according to claim 12, wherein the production plan is calculated by digitizing each priority set in accordance with each item of the product in such a manner that the value increases as the priority greatens, and carrying out the optimization processing of minimizing the sum total obtained by multiplying the delayed quantity of the product for each item by the priority for each item.

19. The production planning method according to claim 12,
wherein the plurality of takeoff objectives are set by additionally setting a plurality of takeoff objectives of the product whose predetermined deadline and quantity are not determined with respect to the plurality of takeoff objectives, and
the production plan is calculated by obtaining production plan data that satisfies the plurality of takeoff objectives additionally set by the multiple-takeoff-objectives setting section.

20. A non-transitory computer readable storage medium storing a production plan processing program, wherein the program, when executed by a processor, causes the processor to perform a method comprising:
setting a plurality of takeoff objectives having different priorities based on a takeoff request of manufacturing a preset quantity of a product corresponding to a plurality of preset items and taking off the product at a target step in manufacturing lines by a delivery deadline, throughput of each production line constituting at least the target step, and basic information of a production plan for each manufacturing line;
obtaining production plan data satisfying the plurality of set takeoff objectives;
obtaining takeoff objective delay data indicating that the production plan data is delayed with respect to the plurality of takeoff objectives; and
displaying at least a degree of delay of the product based on the production plan data and the takeoff objective delay data in accordance with each of the plurality of takeoff objectives in a preset display conformation,
wherein the plurality of takeoff objectives include a first takeoff objective as the plurality of takeoff objectives required to satisfy the takeoff request by the delivery deadline, a second takeoff objective obtained based on a restriction in throughput for each date and each of the items with respect to a step when manufacturing the product at a next step of the target step, and a third takeoff objective obtained by leveling the second takeoff objective in accordance with each of the dates, a highest priority being set to the first takeoff objective, a second highest priority being set to the second takeoff objective, and a lowest priority being set to the third takeoff objective,
wherein the production plan data is obtained by digitizing each priority set to each of the items of the product and each of the priorities for each of the first to third takeoff objectives in accordance with a value of each priority, and carrying out optimization processing of minimizing a sum total of a product of a delayed quantity for each of the items of the product and the priority value of the delayed first to third takeoff objectives after digitization, the production plan data satisfying the first to third takeoff objectives set by the multiple-takeoff-objective setting section, and
wherein, when said each priority of an item i in respective of the items of the product is Pi, and the production plan data T is calculated by said optimization processing by minimizing:

item $\Sigma$(delayed days×quantity×$Pi$)×$W_1$

+item $\Sigma$(delayed days×quantity×$Pi$)×$W_2$

+item $\Sigma$(delayed days×quantity×$Pi$)×$W_3$, where $W_1$, $W_2$ and $W_3$ represent the first, second and third takeoff objectives.

* * * * *